Patented Oct. 12, 1943

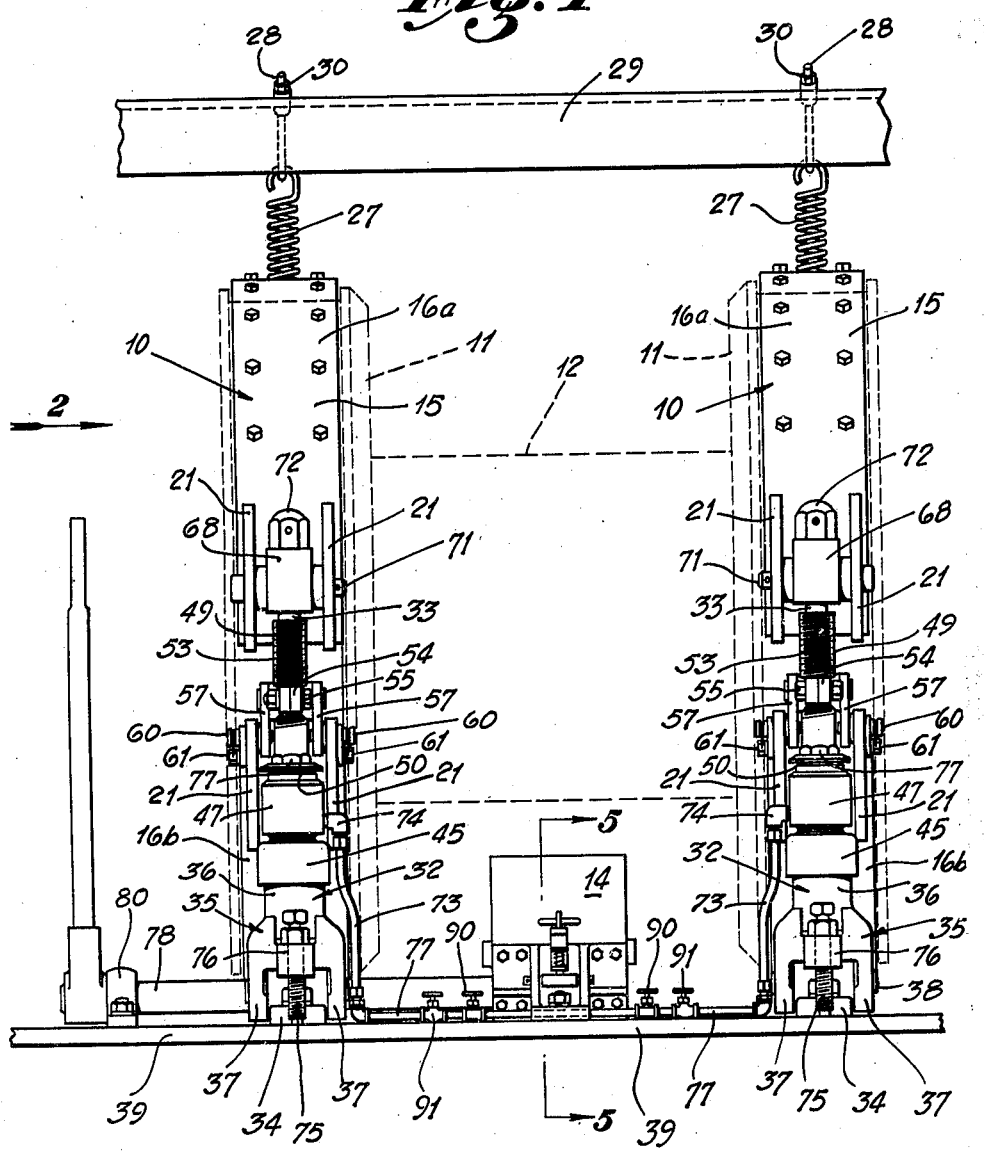

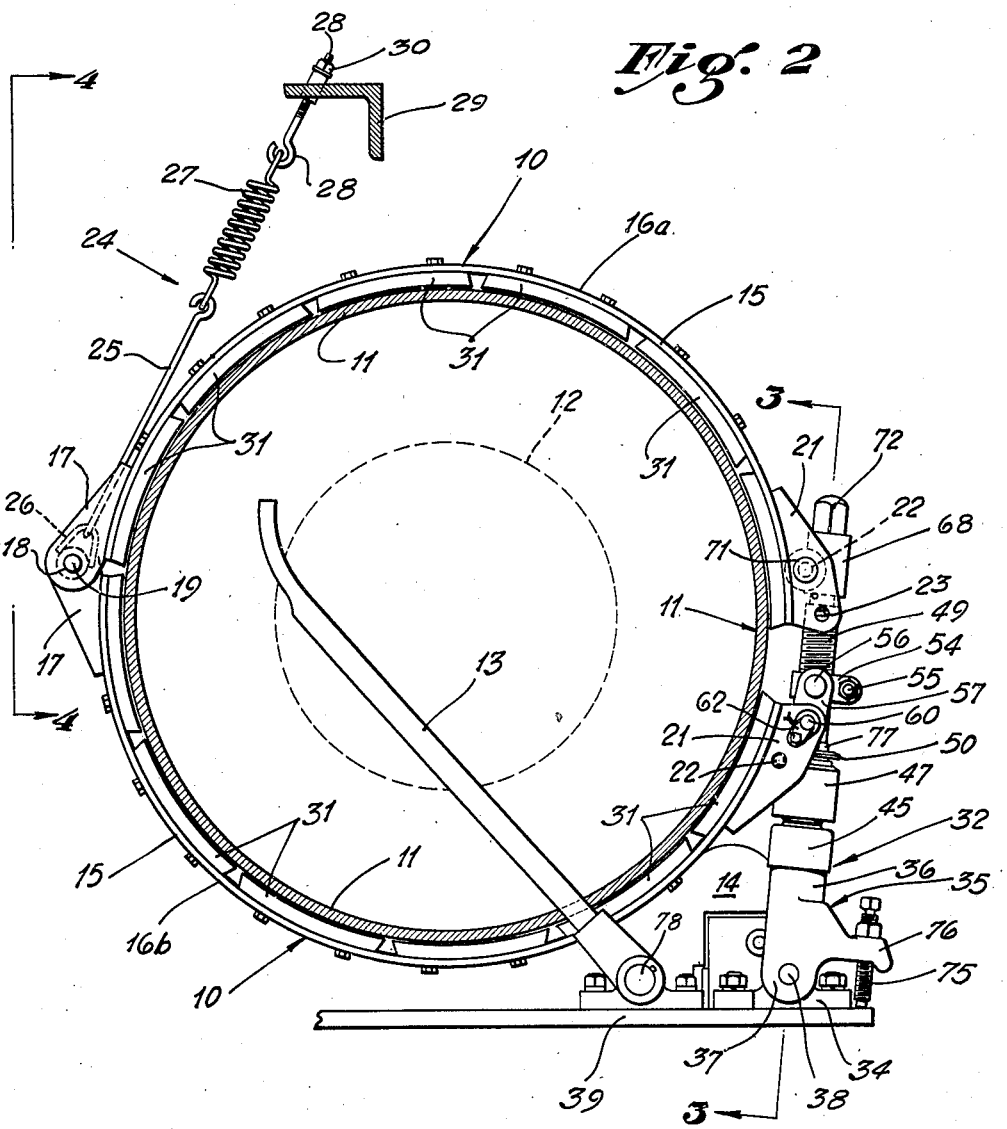

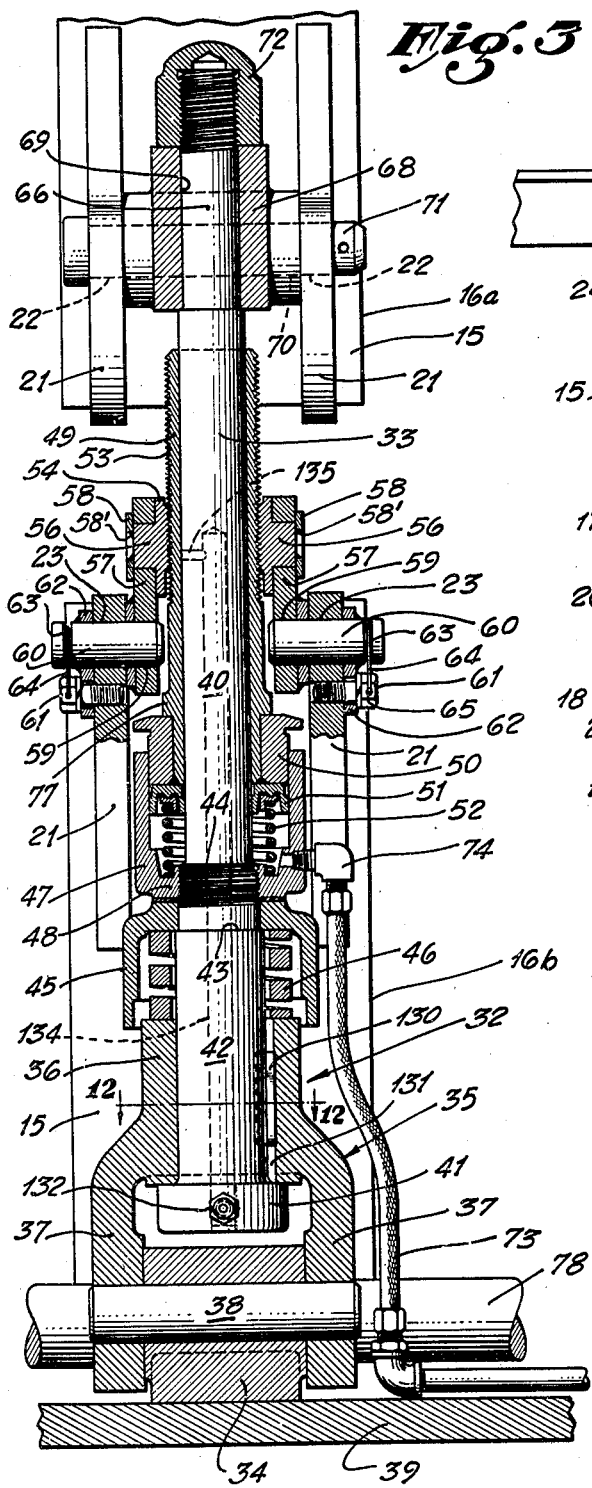

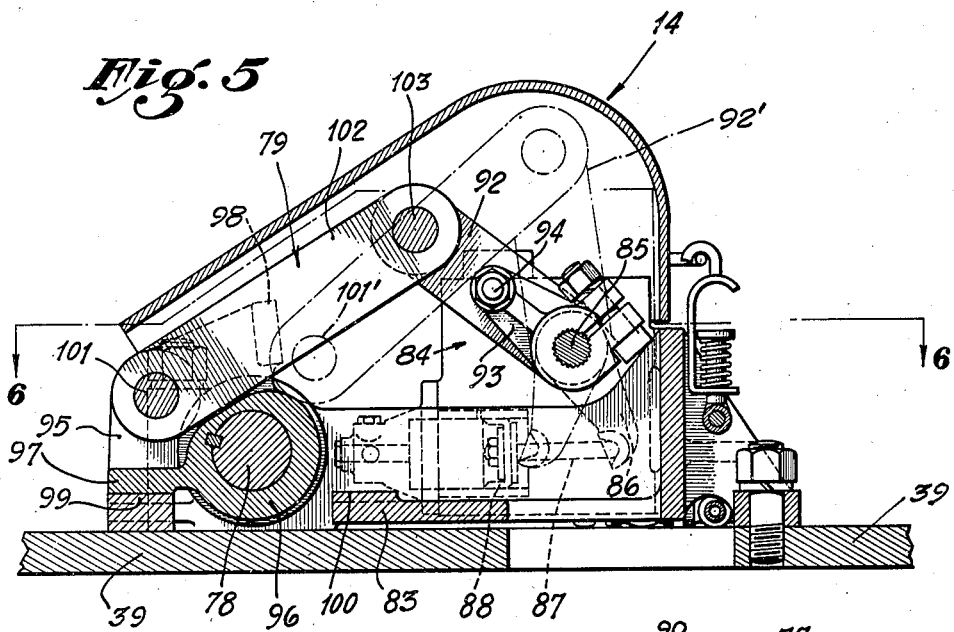
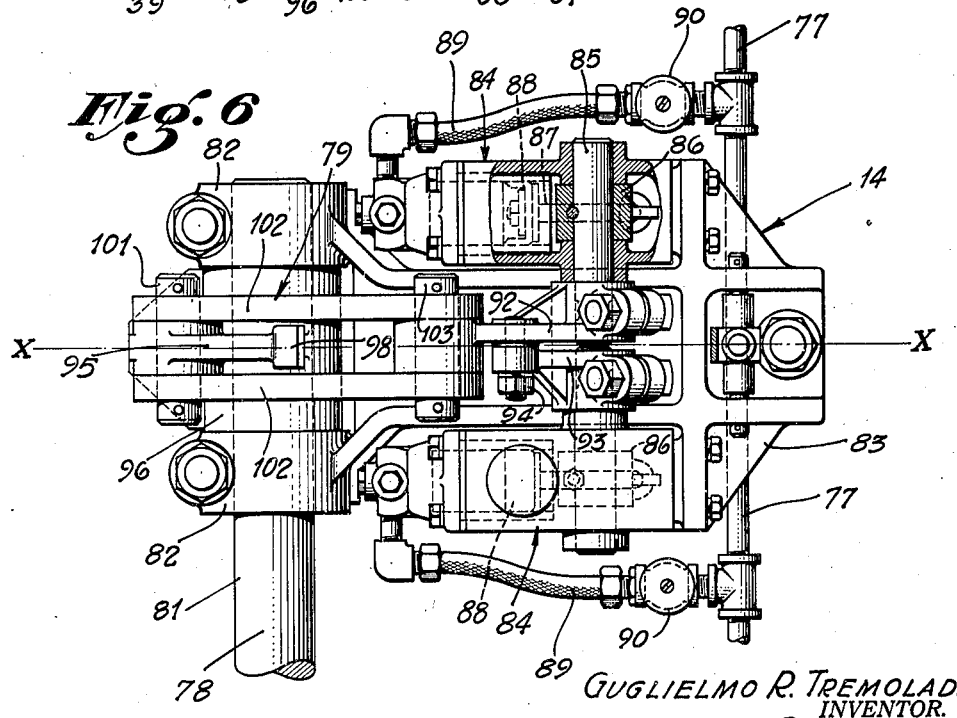

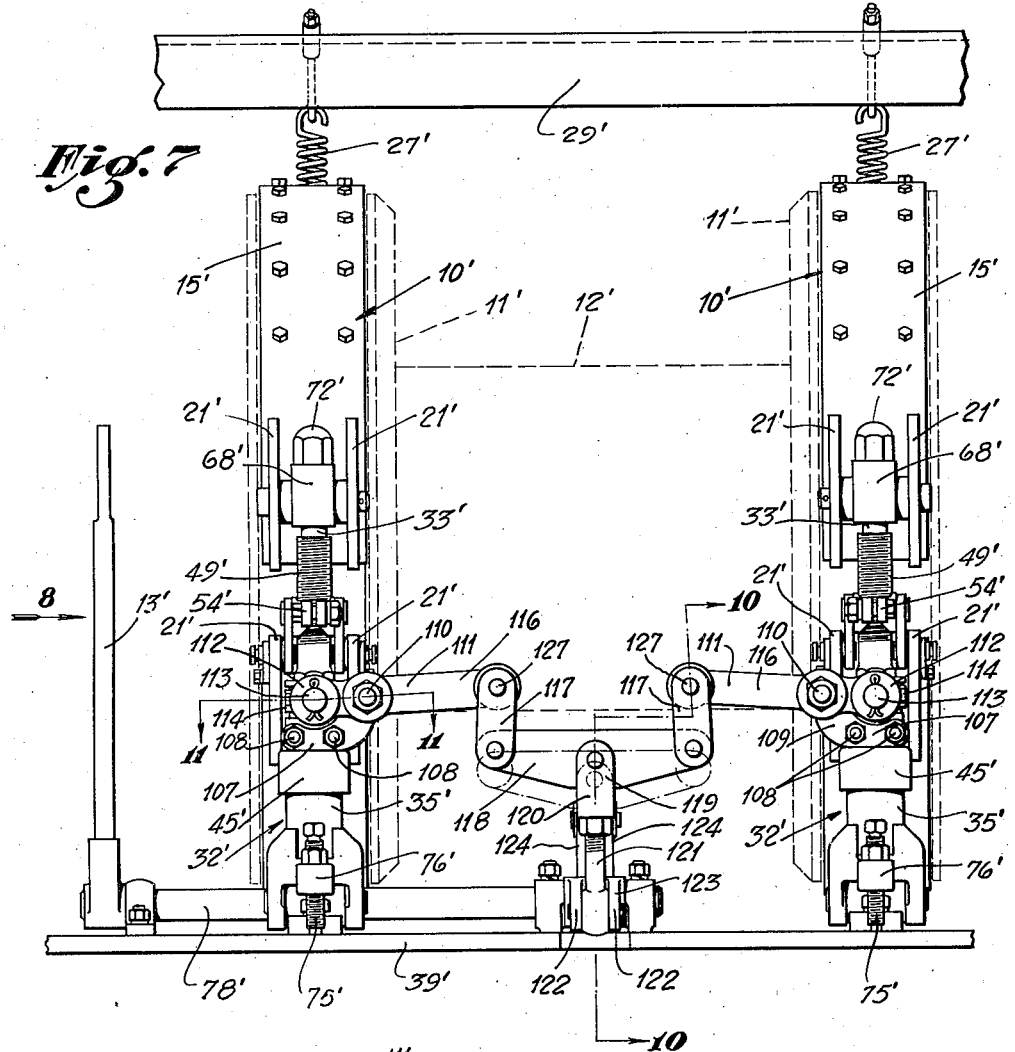
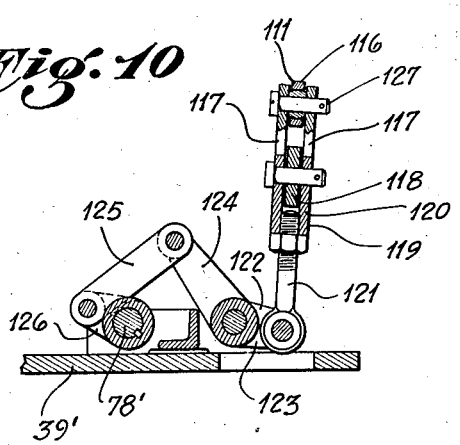

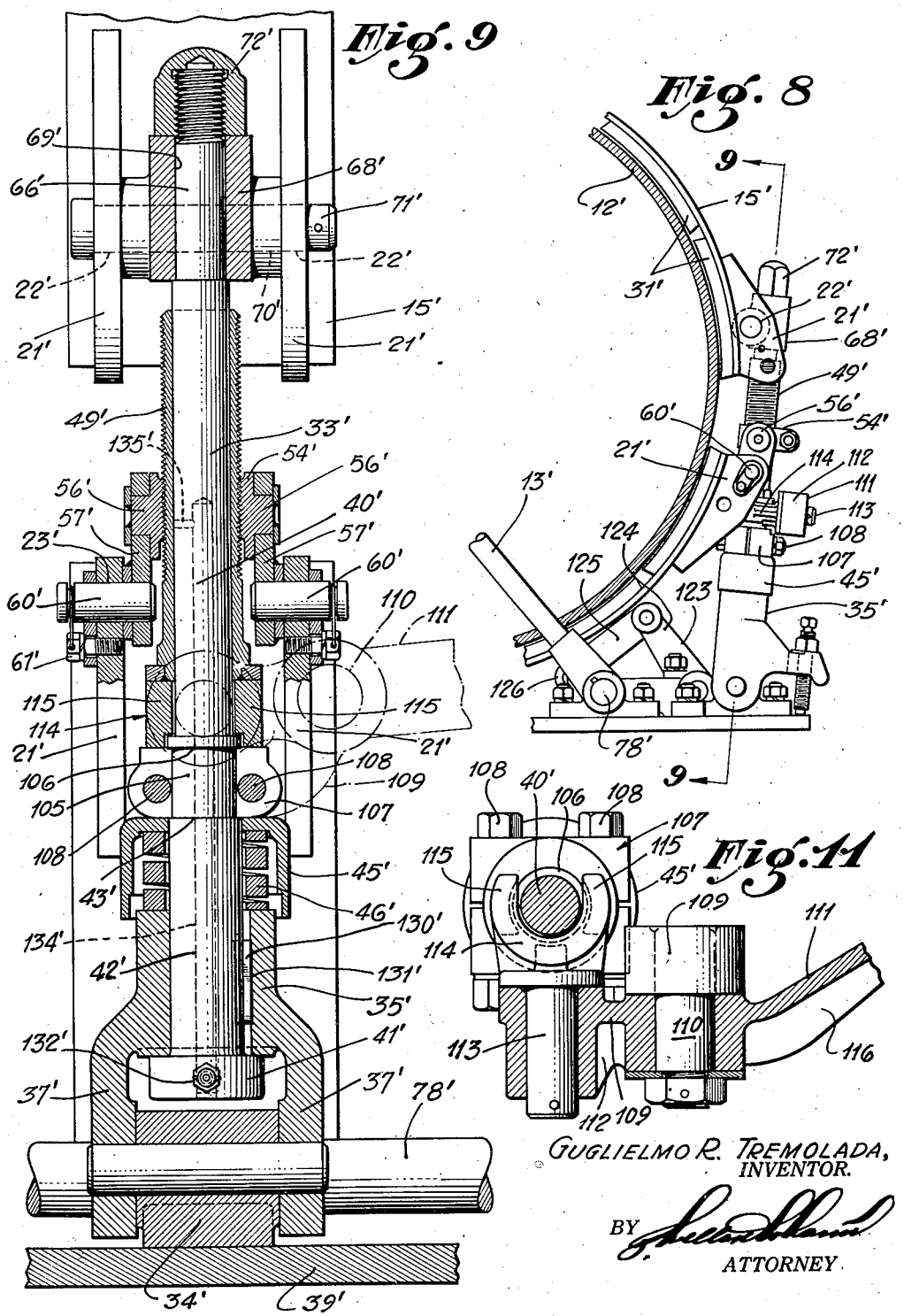

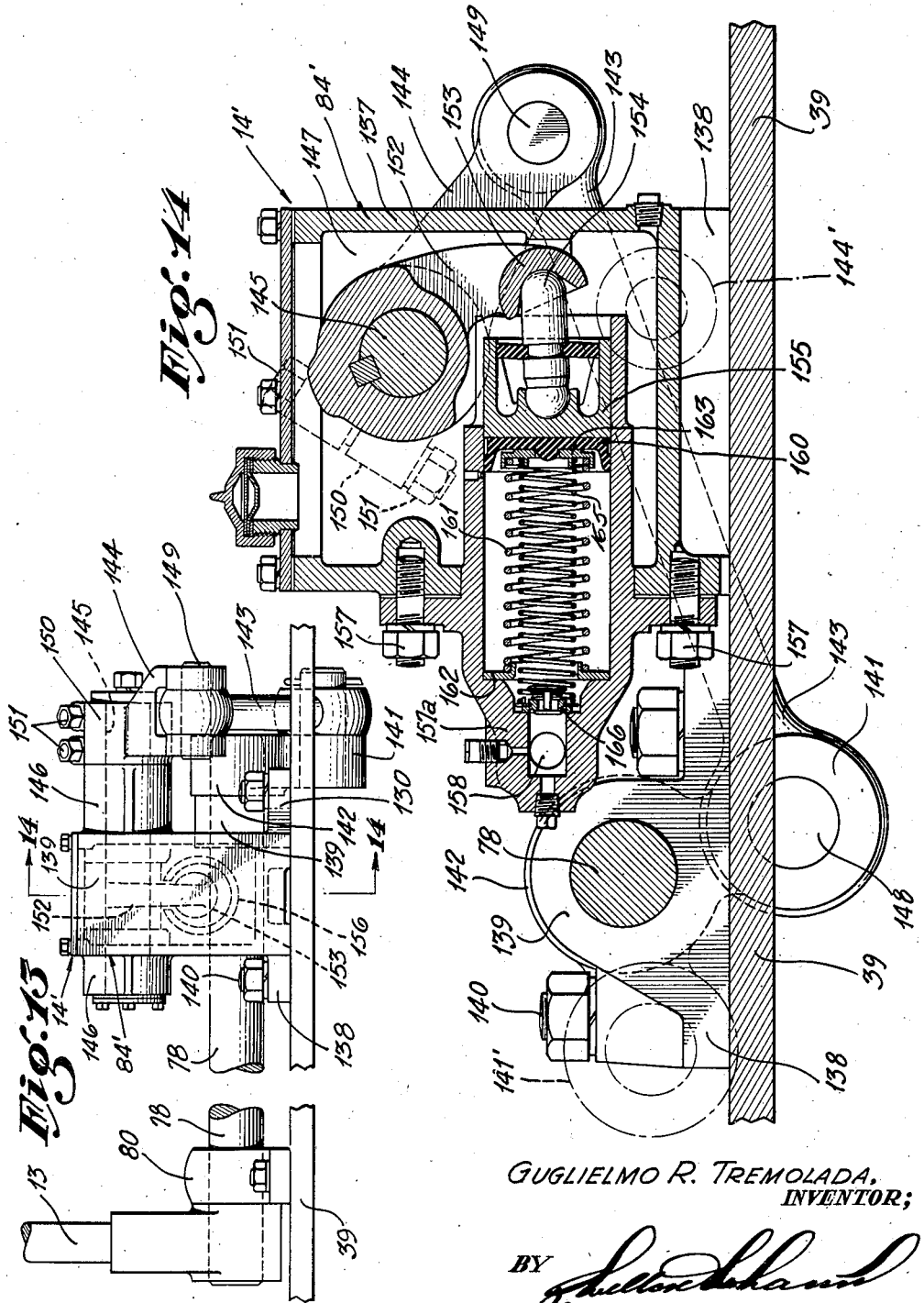

2,331,517

UNITED STATES PATENT OFFICE 2,331,517

BRAKE

Guglielmo R. Tremolada, Los Angeles, Calif., assignor to Emsco Derrick & Equipment Company, Los Angeles, Calif., a corporation of California Application October 9, 1940, Serial No. 360,346

27 Claims. (Cl. 188—151)

My invention relates to band brakes, and relates in particular to a heavy duty brake suitable for use with a draw-works of a rotary well drilling equipment.

It is an object of the invention to provide a brake of the above character of rugged form and by which ample braking force may be effected.

It is an object of the invention to provide a brake of this character wherein the annular brake member or band is accurately formed of material having spring characteristics so that it may be relatively closely fitted around the brake drum and may not have great clearance when it is extended or released.

It is an object of the invention to provide a brake having a circular band substantially entirely surrounding the drum and having a support adjacent to one side of the drum, this support being arranged for limited movement toward and away from the drum as the brake band is contracted and expanded.

It is an object of the invention to provide a device of the character set forth in the preceding paragraph wherein the support comprises a tangential guide and a body sliding on this guide with means for connecting the dead end of the brake band to the support and for connecting the live end of the brake band to the slidable body, there being means for moving the body on the tangential guide so as to move the live end of the brake band toward the dead end thereof to constrict the brake band around the drum.

A further object of the invention is to provide a brake wherein the back kick resulting from premature engagement of the drive clutch of the draw-works is absorbed or relieved. My present invention has means comprising a yielding resistance to permit movement of the support of the brake band in tangential direction when reverse movement of the drum applies tangential force through the band to the support.

A further object of my invention is to provide a brake of the character hereinbefore described having simple means for applying a contractile force to the brake band to bring the same into braking engagement with the brake drum. In one form of my invention the contractile force is hydraulically applied to the brake band and in the other form of the invention the contractile force is applied through mechanical leverage and linkage means. In both forms of the invention the brake band is maintained in full floating relation to the drum and is applied to the drum in such a manner that chattering is avoided.

A further object of the invention is to provide a dual brake device wherein the pressure applied to the brake band to contract the same is at all times equalized.

A further object of the invention is to provide a brake of the character described wherein the actuating mechanism for the brake band is compact in form so that it may be placed at the lower front portion of the draw-works and which has a single adjusting means associated with each brake band for taking up for wear.

Further objects and advantages of the invention will be brought out in the following part of the specification.

Referring to the drawings which are for illustrative purposes only:

Fig. 1 is a front elevational view of a preferred form of my invention.

Fig. 2 is a side elevation taken from the position of the arrow 2 in Fig. 1.

Fig. 3 is an enlarged fragmentary section taken on the line 3—3 of Fig. 2.

Fig. 4 is a fragmentary elevational view taken from the position indicated by the line 4—4 of Fig. 2.

Fig. 5 is an enlarged cross-section on a plane represented by the line 5—5 of Fig. 1.

Fig. 6 is a plan view of the device shown in Fig. 5, with the cover thereof removed and with parts thereof sectioned on the plane indicated by the line 6—6 of Fig. 5.

Fig. 7 is a front elevation of an alternative form of my invention having mechanical actuating means instead of hydraulic actuating means.

Fig. 8 is a fragmentary side elevation taken from the position of the arrow 8 of Fig. 7.

Fig. 9 is an enlarged fragmentary sectional view taken on a plane represented by the line 9—9 of Fig. 8.

Fig. 10 is a fragmentary section taken as indicated by the line 10—10 of Fig. 7.

Fig. 11 is a fragmentary section taken as indicated by the line 11—11 of Fig. 7.

Fig. 12 is a fragmentary section taken as indicated by the line 12—12 of Fig. 3.

Fig. 13 is a fragmentary front elevation of an alternative form of hydraulic pressure device and associated actuating lever means.

Fig. 14 is an enlarged fragmentary sectional view taken as indicated by the line 14—14 of Fig. 13.

In Fig. 1 I show a pair of brake structures in spaced relation corresponding in position to the brake drums 11 of a spool or drum 12 of the type employed in rotary drawworks. A feature of my invention is that the brake structure 10 may be readily installed at different distances of separation in accordance with the axial dimensions of cable spools. The brake structures 10 are duplicates and are actuated through use of a single lever 13 which operates a unitary hydraulic pressure device 14.

In the following I shall describe a single brake structure 10, the description of which will apply to the details of both of the brake structures 10 shown in Fig. 1. As shown in Fig. 2 the brake structure 10 comprises a brake band member 15 comprising upper and lower substantially semi-cylindrical brake bands 16 specifically indicated as 16a and 16b. These brake bands 16 are duplicates so that they may be used either as an upper brake band 16a or as a lower brake band 16b. Each brake band 16 is made from spring steel so that it tends to retain its substantially semi-circular form. At the rear end of each band 16 there is a pair of projecting fins 17 with openings 18 therein to receive a hinge pin 19. As shown in Fig. 4, the members 17 of the upper and lower bands 16a and 16b are held in desired spaced relation by a spacer sleeve 20 which fits around an intermediate portion of the pin 19.

At the front end of each band 16 there is a pair of projecting plates 21, each of these plates having an inner opening 22 and an outer opening 23. The rear or leftward portion of the brake member 15, as shown in Fig. 2, is yieldably supported by supporting means 24 compriisng a lower link 25 which is connected through an eye member 26 with the sleeve 20, an intermediate spring member 27 and an upper screw hook 28 which extends through a structural part 29 of the drawworks and has an adjusting nut 30 for vertical adjustment to change the tension in the spring 27. In accordance with standard practice, each brake band 16 is provided with an inner facing of brake blocks 31.

The front ends of the brake bands 16 are connected to a support 32 which, as best shown in Fig. 3, includes a slide member 33 disposed on the line 3—3 of Fig. 2, which is tangential to a circle concentric to the brake drum 11 with which the brake band member 15 is employed. This slide member 33 is part of a bar 40 which is supported by a bracket 34 and a fitting 35 so as to have limited movement toward and away from the brake drum 11 during the different phases of the action of the braking device. The fitting 35 comprises a cylindrical body 36 and a pair of downwardly extending legs 37 connected by means of a pin 38 to the bracket 34 which is secured to any suitable foundation 39 such as the base of the drawworks with which the brake is used. The bar 40, comprising the slide 33, has a head 41 at its lower end, and an enlarged portion 42 which projects upward through the cylindrical body 36 of the fitting 35. There is a shoulder 43 at the upper end of the enlargement 42, and between the enlargement 42 and the slide 33 there is a threaded section 44.

An inverted cup 45 surrounds the portion of the enlargement 42 which projects above the upper end of the cylindrical body 36 and conceals a heavy spring 46 having the function of urging the bar 40 upward so as to hold the head 41 normally in engagement with the lower end of the cylindrical body 36. The top wall of the cup 45 is held against the shoulder 43 by a cylinder 47 having a lower internally threaded wall 48 which is screwed downward on the threaded portion section 44 of the bar 40, thereby forcing the upper wall of the cup 45 into engagement with the shoulder 43 against the force of the spring 46.

A sleeve 49 forms a body slidable on the slide 33. This sleeve has at its lower end an annular piston 50 which projects downward into the upper end of the cylinder 47, there being an annular sealing member 51 held against the lower face of the piston 50 and the sleeve 49 by means of a spring 52. The sealing member 51 makes sealing engagement with the adjacent surface of the bar 40 and also makes sealing engagement with the inner surface of the cylinder 47. The upper portion of the sleeve 49 is provided with external threads 53 and engaging these threads 53 there is a split nut 54. The split nut 54 is provided with a clamping bolt 55 whereby it may be clamped around the sleeve 49 so as to prevent relative rotation of the nut 54 and the sleeve 49. As shown in Fig. 3, the nut 54 has diametrally projecting trunnions 56 from which links 57 are hung, these links being held on the trunnions by circular plates 58, secured to the ends of the trunnions 56 by welds 58'.

The lower portions of the links 57 are provided with openings 59 to receive the inner ends of pins 60 which project inward toward the sleeve 49 from the openings 23 in the plates 21 at the front end of the lower brake band 16b. These pins 60 are closely fitted in the opening 23 so that the inner ends thereof provide relatively rigid pivots to engage the openings 59 in the lower portions of the links 57. The pins 60 are secured in the openings 23 by means of screws 61 which are threaded into the plates 21 and clamp tightly against the outer faces of the flanges or plates 62 which are secured to the outer portions of the pins 60. The outer portions of the pins 60 are provided with grooves 63 to receive locking wires 64 which are threaded through openings 65 in the heads of the screws 61 after the screws 61 are firmly tightened.

The upper end of the bar 40 has a section 66 of reduced diameter which is separated from the slide 33 by means of a shoulder 67. To connect the upper end of the bar 40 to the front or rightward end of the upper brake member 16a I provide a swivel block 68 having an upright or nearly vertical opening 69 to receive the section 66 of the rod 40, and having a lateral opening 70 to receive a pin 71 which passes through openings 22 in the plates 21 at the front end of the brake band 16a. A cap 72, threaded onto the upper end of the bar 40, limits upward movement of the swivel block 68, but does not prevent relative rotation of the block 68 and the bar 40.

Operation of the device shown in Figs. 3 and 4 is accomplished by the application of hydraulic fluid through a flexible conduit 73 and inlet fitting 74 into the interior of the cylinder 47 so that the pressure thereof will act upwardly against the piston 50 to move the sleeve 49 upwardly on the slide portion 33 of the bar 40, thereby causing the front end of the lower band 16b to move toward the front end of the upper band 16a. The brake band member 15 will be accordingly constricted around the drum 11 as shown in Fig. 2. When the hydraulic pressure is released from the cylinder 47 and the front end of the brake band 16b is allowed to move downward, the effective diameter of the brake band member 15 will increase, the spring 27 will lift the rearward portion of the brake band member 15, and the support 32 will swing rightward until the stop screw 75 engages the base 39, whereupon the brake band member 15 will again assume a position substantially concentric to the drum 11, as shown in Fig. 2. It will be noted that the spring 27 is disposed at an angle so that it has a rightward component of force as well as a lifting action. This rightward component will swing the support 32 rightward through a distance determined by the position of the adjusting screw 75, Fig. 2, so that the expanded brake band member 15 will be substantially concentric to the drum 11. The adjusting screw 75 threads through an arm 76 which projects forward from the lower fitting 35 of the support 32 and the lower end of the screw 75 is adapted to engage the member 39 when the support 32 swings rightward.

An especial feature of the invention is that the brake band member may be readily adjusted to proper working relation to the drum 11, by two simple adjustments. Above the piston 50, the sleeve 49 has a shoulder 77 of hexagonal form so that a wrench may be applied thereto to turn the sleeve 49 when the clamping bolt 55 of the nut 54 is released. Accordingly, the sleeve 49 may be then turned within the nut 54 to cause the nut to travel upward on the threads 53 of the sleeve 49, after which the adjustable parts may be locked in adjusted position by tightening the clamping bolt 55. Then, the adjusting screw 75 may be set so as to limit the outward movement of the support 32 to the desired extent.

Rotation of the bar 40 relative to the fitting 35 is prevented by a key 130 which is mounted in the enlargement 42 of the bar 40 in position to project into a keyway 131 in the cylindrical body 36. For lubrication of the interior of the sleeve 49, so that it may slide freely on the slide portion 33 of the bar 40, I provide a grease fitting 132 which is threaded into the head 41 and the lower end of the bar 40, as shown in Figs. 3 and 12, this grease fitting 132 communicating through a radial hole 133 with an axial hole 134 in the bar 40, the upper end of which axial hole 134 has communication through a lateral port 135 with the exterior space of the bar 40 lying within the sleeve 49. The engagement of the key 130 with the keyway 131, prevents rotation of the bar 40 so that the grease fitting 132 will be held in a position projecting outwardly between the legs 37 of the fitting 35.

As shown in Fig. 1 the flexible conduits 73 are connected through piping 77 with the hydraulic pressure device 14 which is actuated in response to forward swinging movement of the lever 13 through a shaft 78 and linkage and lever mechanism 79 shown in Figs. 5 and 6. As shown in Fig. 1, the lever end of the shaft 78 is supported in a bearing 80, and the other end 81 of the shaft 78 is supported in bearings 82 disposed at the rear of the hydraulic pressure device 14, as shown in Fig. 6.

This hydraulic pressure device 14 has a base 83 falling symmetrically on opposite sides of a center line X—X, Fig. 6. On opposite sides of the center line X—X the base 83 supports a pair of standard hydraulic master cylinders or hydraulic compressor units 84, each of which has a shaft 85 projecting toward the center line X—X, Fig. 6, and each shaft has on the inner portion thereof a lever 86 which, in accordance with standard practice, engages a push rod 87 of a piston 88. Each hydraulic unit 84 is connected through a conduit 89 and a valve 90 with the piping 77, and valves 91 are placed in the piping 77 between the valves 90 and the respective conduits 73 which lead to the cylinders 47.

On one of the shafts 85 a relatively long lever 92 is secured and on the other of the shafts 85 a shorter lever 93 is secured, these levers 92 and 93 being interconnected by means of a stud bolt 94. A short lever 95 is keyed on the shaft 78, this lever 95 having a hub 96 surrounding the shaft 78 between the bearings 82 of the base 83. The lever 95 has stops 97 and 98 arranged substantially at an angle of 90° and being respectively positioned so that the stop 97 will engage a wall 99 of the base 83 while the shaft 78 is rotated in anti-clockwise direction so as to carry the lever 95 into the position in which it is shown in full lines in Fig. 1. When shaft 78 is rotated in clockwise direction the stop 98 will engage a wall 100 forming part of the base 83 to limit clockwise rotation of the lever, thereby preventing application of undue strain being transmitted to any of the parts of the hydraulic compressor units 84. A transverse pin 101 connects the lever 95 through links 102 with a pin 103 which passes through the outer end of the lever 92. When the stop 97 is in engagement with the wall 99 the levers 95 and 92 lie in substantially parallel relation, and as the lever 95 is rotated in clockwise direction, the pin 101 will be moved toward the position in which it is shown in dotted lines 101', the links 102 carrying the lever 92 toward or into the position indicated by dotted lines 92' in Fig. 5. With the arrangement of levers 95 and 92 as shown, the first part of the movement of the lever 95 from its position of Fig. 5 will cause a relatively rapid movement of the lever 92, but as the pin 101 approaches or passes through the position indicated at 101', the proportionate angular movement of the lever 92 will approach very close to zero value and the force exerted through the links 102 will be at correspondingly high value. Accordingly, movement of the brake lever 13 will produce an initial flow of hydraulic fluid into the cylinders 97 of relatively large volume and comparatively low pressure, but as the operative movement of the brake lever 13 continues the volume of hydraulic fluid delivered to the cylinders 47 will be gradually reduced and the pressure thereof will be proportionately increased, making it possible through movement of the brake lever 13 to quickly bring the brake blocks 31 into engagement with the brake drum 11 and to thereafter apply ample braking pressure without exertion of undue force against the lever 13 by the driller.

The draw-works brake disclosed herein is especially useful in conjunction with draw-works driven from internal combustion engines through clutch means, and is so constructed as to avoid liability of injury to the driller through kickback of the brake lever when the driving clutch is engaged in advance of the release of the brake. When the cable is being played out from the spool 12, such spool will rotate in an anti-clockwise direction, and when the brake-band member 15 is constricted around the drum 11, the force frictionally transmitted thereto from the drum 11 tends to energize the brake, and the brake-band member 15 will transmit to the support 32 an upward force. When it is desired to wind the cable on the spool 12, engagement of the driving clutch will cause the spool 12 to rotate in clockwise direction, and if the brake is not released in properly timed relation to the engagement of the clutch, the live end of the brake-band member 15, namely the front end of the lower band 16b, will transmit an abrupt heavy downward force through the sleeve 49 to the piston 50 so that a blow is struck against the hydraulic fluid. This blow is relieved to a practical extent so that a build-up in pressure in the hydraulic units 84 will not result in a kick-back of the lever 13, this release of the blow being accomplished by the downward movement of the bar 40 and the cylinder 47 against the upward force exerted by the spring 46.

In Fig. 13 I show an alternative hydraulic pressure device 14' which may be substituted for the hydraulic pressure device 14 shown in Figs. 1, 2, 5, and 6. This device 14' employs a single compressor unit 84' instead of a pair of compressor units 84 as shown in Figs. 5 and 6, the details of construction of the compressor unit 84' is being shown in Fig. 14 taken in conjunction with Fig. 13.

The compressor unit 84' includes a shell 137, preferably formed integrally with a base 138, which projects rearward or leftward from the shell 137 and has thereon a bearing 139 to receive one end of the operating shaft 78 to which the operating lever 13 is keyed as shown in Figs. 1 and 2. The base 138 is secured to the bottom wall or base plate 39 of the draw-works by means of bolts 140. A relatively short crank 141 is provided, this crank 141 having a hub 142 keyed on the shaft 78 adjacent to the bearing 139. When operating rotation is transmitted through the shaft 78 from the lever 13, the crank 141 will rotate in clockwise direction from the position in which it is shown in full lines in Fig. 14 toward the position in which it is shown in dotted lines 141'.

The lever 141 is connected by means of a tension link 143 with a lever 144 which is fixed on the outer end of a shaft 145 carried in bearings 146 in the upper part of the shell 137 in a position to pass across the upper part of the oil chamber 147 formed by the shell. The lower end of the link 143 is connected to the lever 141 by means of a pin 148, and the other end of the link 143 is connected by a pin 149 to the swinging end of the lever 144. The hub 150 of the lever 144 is clamped on the shaft 145 by means of clamping bolts 151.

On the inner portion of the shaft 145 there is keyed an actuating lever 152 having a cup or socket 153 at the swinging end thereof to engage a thrust pin 154 which in turn engages a piston 155 slidable in a cylinder 156 which is secured to the rear or left face of the shell 137 by means of bolts 157. At the outer end of the cylinder 156 there is a reduced projection 157a having a discharge passage 158 to which the hydraulic piping 77 of Fig. 1 is connected when the hydraulic pressure device 14' is substituted for the device 14.

A cup sealing member 160 is held against the inner face of the piston 155 by means of a compression spring 161 which extends from a plate 162 at the leftward end of the cylinder 156 to a plate 163 disposed within the sealing cup 160. A spring 165, of smaller diameter, extends from the plate 163 to a valve 166 provided at the leftward end of the cylinder 156 to limit the rate at which fluid may be discharged from the cylinder 156 into the discharge opening 158 when actuating pressure is applied to the piston 155. The valve 166 is of a type now employed in hydraulic master cylinders for this purpose. When the piston 155 is moved in rightward direction, the valve 166 may yield rightward from the position in which it is shown to permit a free return of hydraulic fluid from the passage 158 into the cylinder 156. The link 143 is of such length that when the lever 141 is in its full line position, Fig. 14, the lever 144 will be in the position thereof shown in full lines, and as the lever 141 is swung toward the dotted line position 141', the lever 144 will be swung toward the dotted line position thereof 144', the result being that, as the brake is applied there will be a gradual increase in the power ratio due to the fact that as the lever 144 is swung toward a position perpendicular to the longitudinal center line of the link 143, the angle of the crank 141 relative to the longitudinal center line of the link 143 will be decreased from 90° to substantially zero value.

In the mechanically actuated form of my brake shown in Figs. 7 to 10 inclusive, I employ brake structures 10' employing many of the parts used in the brake structure 10, and which, in order to avoid duplication of description, will be identified by the same numerals with the addition of a prime mark applied thereto. In this form of the invention the cylinder 47 is eliminated and also the fluid pressure device 14 with its associated conduits. As best shown in Fig. 9, the bar 40' has a cylindric section 105 above the shoulder 43' defining the upper end of the enlarged section 42', and spaced from the shoulder 43' there is a collar 106 to define the upper end of the cylindric section. To hold the cup 45' down against the upward force of the spring 46' a split block 107 is clamped around the cylindric section 106 by means of heavy bolts 108. The split block 107 has a laterally and upwardly extending arm 109 which carries a fulcrum bolt 110 disposed in a horizontal plane and in spaced relation to the lower part of the slide portion 33' of the bar 40'. A lever arm 111 is hinged on the fulcrum bolt 110 and, in the portion 112 thereof which extends across the face of the bar 40, the lever arm 111 carries a heavy pin 113, having a yoke 114 comprising fingers 115 which extend across opposite sides of the bar 40' above the collar 106. The lower end of the sleeve 49' is supported on the yoke 114; and when the projecting arm 116 of the lever 111 is moved downward, the yoke 114 will be moved upward to cause the sleeve 49' to slide upward on the slide portion 33', thereby actuating or applying the brake.

As shown in Fig. 7, the arms 116 of the levers 111 project toward each other and are connected by depending links 117 with the ends of a floating cross-bar 118, the center of which is engaged by means 119 for exerting a downward force. The cross-bar 118 and the links 117 constitute an equalizing means whereby the force applied in downward direction through the means 19 will be equally distributed to the levers 111.

The force exerting means 119 includes a clevis 120 connected by means of an adjustable bar 121 with the forwardly extending levers 122 of the bell crank 123. As shown in Fig. 10, this bell crank 123 has a lever 124 projecting upward therefrom, which lever is connected by means of a link 125 to a relatively short lever 126 mounted on the inner end of the actuating shaft 78' adapted to be rotated by means of the hand lever 13'.

The mechanically actuated form of my invention shown in Figs. 7 to 11 also includes the feature comprising means for absorbing the kickback resulting from engagement of the drive clutch of the draw-works ahead of the release of the brake. When such kick-back occurs, the bar 40' and the sleeve 49' will be moved downward relative to the fitting 35' and against the action of the spring 46'. This will result in a downward rotation of the fulcrum levers 111 around the pins 127 by which they are connected to the upper end of the links 117, and as a result thereof the yokes 114 will be moved downward relative to the fulcrum bolts 110 and the blocks 107, thereby causing a downward relative movement of the sleeves 49' on the slide portions 33' to accomplish a releasing of the brakes sufficient to permit slippage of the brake drum.

In both forms of the invention disclosed herein, the brake band operating mechanisms are disposed at the front of the brake drums to which they are applied and occupy relatively small space. These mechanisms are in such position that they may be readily adjusted from the front of the draw-works in the manner described.

I claim as my invention:

1. In a brake of the character described, for use with a brake drum, the combination of: a brake band member to encircle said drum, with the ends thereof disposed in adjacent relation; a support contiguous to said ends, said support being mounted so as to have limited movement toward and away from said drum and having a slide lying along a line tangential to a circle concentric with said brake drum; a body slidable on said slide, said body being connected to one of said ends of said band member; means connecting the other end of said band member to said support; and means for moving said body relatively to said connecting means so as to constrict said band around said brake drum.

2. In a brake of the character described, for use with a brake drum, the combination of: a brake band member to encircle said drum, with the ends thereof disposed in adjacent relation; a support contiguous to said ends, said support having a slide lying along a line tangential to a circle concentric with said brake drum; means mounting said support so that it may have movement toward and away from said drum, so that it cannot move in one direction along said tangential line and so that it may have movement in the other direction along said tangential line; yieldable means to resist movement of said support in said other direction along said tangential line; a body slidable on said slide, said body being connected to one of said ends of said band member; means connecting the other end of said band member to said support; and means for moving said body relatively to said connecting means so as to constrict said band around said brake drum.

3. In a brake of the charatcer described, for use with a brake drum, the combination of: a brake band member to encircle said drum, with the ends thereof disposed in adjacent relation; a support contiguous to said ends, said support being mounted so as to have limited movement toward and away from said drum and having a slide lying along a line tangential to a circle concentric with said brake drum; a body slidable on said slide, said body being connected to one of said ends of said band member; means connecting the other end of said band member to said support; and hydraulic means operative between said support and said body to move said body relatively to said connecting means so as to constrict said band around said brake drum.

4. In conformable brake means for use with a draw-works having a base structure, a plurality of spaced brake drums and brake bands therefor, the combination of: a plurality of separate mounting members, each adapted to be secured to said base structure adjacent each of said drums; connecting means on each of said mounting members to engage cooperating portions of said bands; separate hydraulic means at each of said supports, operative to move said connecting means so as to constrict said brake bands on their respective drums; force exerting means; pressure applying means employing force from said force exerting means to compress a liquid; and conduit means for said liquid, connecting said pressure applying means with said separate hydraulic means.

5. In conformable brake means for use with a draw-works having a base structure, a plurality of spaced brake drums and brake bands therefor, the combination of: a plurality of separate mounting members, each adapted to be secured adjacent each of said drums; separate hydraulic means carried respectively on each of said mounting members and each being operative to constrict a brake band into braking engagement with its cooperating drum; a single force exerting means; pressure applying means operated by said force exerting means to compress a liquid; and conduit means conformable to the spacing of said hydraulic means, as determined by the spacing of said drums, for connecting said pressure applying means and said hydraulic means.

6. In a brake of the character described, for use with a brake drum, the combination of: a circular brake band to pass around said drum, said band having the free ends thereof lying in adjacent relation; operating means engaging the ends of said band and being operative to draw the same toward each other; means supporting said operating means, said supporting means being movable toward and away from said drum along radial lines and said operating means and said band throughout its length being movable as one body with said supporting means; means urging said supporting means away from said drum; and a stop member to limit the distance said supporting and said operating means may be moved away from said drum, whereby said operating means will move away from said drum when said brake band is released and will move toward said drum when said brake band is tightened on said drum.

7. In a brake of the character described, for use with a brake drum, the combination of: a circular brake band to pass around said drum, said band having the free ends thereof lying in adjacent relation; a guide contiguous to said ends of said band, said guide being elongated in a direction tangential to a circle concentric to said drum; anchor means connecting the dead end of said band to said guide; a body slidable along said guide, said body being connected to the live end of said band; means supporting said guide so that it may move toward and away from said drum, said supporting means embracing a yieldable part to permit movement of said guide in response to forces transmitted through said band when said drum is rotated in reverse direction; and means connected to said guide and to said body to apply a reaction to said guide and to apply a force to said body to move said live end of said band so as to tighten said band on said drum.

8. In a brake of the character described, for use with a brake drum, the combination of: a circular brake band to pass around said drum, said band having the free ends thereof lying in adjacent relation; a guide contiguous to said ends of said band, said guide being elongated in a direction tangential to a circle concentric to said drum; anchor means connecting the dead end of said band to said guide; a body slidable along said guide, said body being connected to the live end of said band; means supporting said guide so that it may move toward and away from said drum, said supporting means embracing a yieldable part to permit movement of said guide in response to forces transmitted through said band when said drum is rotated in reverse direction; and means connected to said guide and to said body to apply a reaction to said guide and to apply a force to said body to move said live end of said band so as to tighten said band on said drum, said last named means including parts so connected and arranged that said movement of said guide in response to reverse movement of said drum will cause a diminution of said force applied to said body.

9. In a brake of the character described, for use with a brake drum, the combination of: a brake band member to encircle said drum, with the ends thereof disposed in adjacent relation; a support contiguous to said ends, said support having a slide lying along a line tangential to a circle concentric with said brake drum; means mounting said support so that it may have movement toward and away from said drum, so that it cannot move in one direction along said tangential line and so that it may have movement in the other direction along said tangential line; yieldable means to resist movement of said support in said other direction along said tangential line; a body slidable on said slide, said body being connected to one of said ends of said band member; means connecting the other end of said band member to said support; and operating means for moving said body relatively to said connecting means so as to constrict said band around said brake drum, said operating means comprising a fulcrum on said support, a lever swinging on said fulcrum and having one end thereof engaging said body, and means for applying force to the other end of said lever to move said body toward said connecting means, the same being so arranged that movement of said support in said other direction will result in a rotation of said lever on said fulcrum in a direction to move said body away from said connecting means.

10. In a brake of the character described, for use with a brake drum, the combination of: a circular band having the free ends thereof in adjacent relation; a bar extending contiguous to said ends and along a line tangential to a circle concentric to said drum; supporting means engaging one end of said bar and permitting said bar to swing toward and away from said drum; swivel means connecting the other end of said bar to the dead end of said band; a member slidable on said bar; means adjustable along said member, to connect said member to the live end of said band; and actuating means operative to move said member along said bar relatively to said swivel means whereby said live end of said band will be moved toward said dead end thereof to tighten said band on said drum.

11. In a brake of the character described, for use with a brake drum, the combination of: a circular band having the free ends thereof in adjacent relation; a bar extending contiguous to said ends and along a line tangential to a circle concentric to said drum; supporting means engaging one end of said bar and permitting said bar to swing toward and away from said drum; swivel means connecting the other end of said bar to the dead end of said band; a sleeve member slidable on said bar; a body threaded on said sleeve member so as to be adjustable along the same, to connect said sleeve member to the live end of said band; and actuating means operative to move said sleeve member along said bar relatively to said swivel means whereby said live end of said band will be moved toward said dead end thereof to tighten said band on said drum.

12. In a brake of the character described, for use with a brake drum, the combination of: a circular band extending around said drum, said band having the free ends thereof in adjacent relation; a bar supported so as to extend contiguous to said free ends of said band, said bar having an abutment at one end thereof; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; and means operative between said sleeve and said abutment to move said sleeve and said body relatively to said anchor means and thereby tighten said band.

13. In a brake of the character described, for use with a brake drum, the combination of: a circular band extending around said drum, said band having the free ends thereof in adjacent relation; a bar supported so as to extend contiguous to said free ends of said band, said bar having an abutment at one end thereof; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; lever means operative between said sleeve and said abutment to move said sleeve and said body relatively to said anchor means and thereby tighten said band; and manually controlled means to apply swinging movement to said lever.

14. In a brake of the character described, for use with a brake drum, the combination of: a circular band extending around said drum, said band having the free ends thereof in adjacent relation; a bar supported so as to extend contiguous to said free ends of said band, said bar having an abutment at one end thereof; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; fluid expansible means connected between said sleeve and said abutment; and manually controlled means for applying fluid pressure to said fluid expansible means to move said sleeve and said body relatively to said anchor means and thereby tighten said band.

15. In a brake of the character described, for use with a brake drum, the combination of: a circular band extending around said drum, said band having the free ends thereof in adjacent relation; a bar extending contiguous to said free ends of said band, said bar having an abutment at one end thereof; a supporting bracket element connected to the abutment end of said bar so as to permit said bar to swing toward and away from said drum; a stop to limit the distance said bar may swing away from said drum; yieldable means urging the assembly comprising said bar and said band in a direction to move said bar away from said drum when said band is in released condition; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; and means operative between said sleeve and said abutment to move said sleeve and said body relatively to said anchor means and thereby tighten said band.

16. In a brake of the character described, for use with a brake drum, the combination of: a circular band extending around said drum, said band having the free ends thereof in adjacent relation; a bar extending contiguous to said free ends of said band, said bar having an abutment at one end thereof; a supporting bracket element connected to the abutment end of said bar so as to permit said bar to swing toward and away from said drum; a stop to limit the distance said bar may swing away from said drum; yieldable means urging the assembly comprising said bar and said band in a direction to move said bar away from said drum when said band is in released condition; kick relieving means comprising a yieldable member disposed between said bar and said supporting bracket to permit a limited movement of said bar in a direction along its axis; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; and means operative between said sleeve and said abutment to move said sleeve and said body relatively to said anchor means and thereby tighten said band.

17. In a brake of the character described, for use with a brake drum, the combination of: a circular band extending around said drum, said band having the free ends thereof in adjacent relation; a bar supported so as to extend contiguous to said free ends of said band, said bar having an abutment at one end thereof; anchor means connecting the other end of said bar to the dead end of said band; a sleeve slidable on said bar; a body threaded on said sleeve; means pivotally connecting the live end of said band to said body; means to rotate said sleeve relative to said body whereby said body will be adjusted longitudinally of said sleeve; a cup surrounding said bar adjacent said abutment with the open end thereof faced toward said sleeve; an annular piston in said cup having operative engagement with said sleeve; and means for applying fluid pressure to the interior of said cup to move said piston.

18. In a brake of the character described, for use with a brake drum, the combination of: a circular brake band to pass around said drum, said band having the free ends thereof lying in adjacent relation; operating means engaging the ends of said band and being operative to draw the same toward each other; means supporting said operating means, said supporting means being movable toward and away from said drum; means urging said supporting means away from said drum and to apply a force to lift the rearward portion of said brake band; and a stop member to limit the distance said supporting and said operating means may be moved away from said drum, whereby said operating means will move away from said drum when said brake band is released and will move toward said drum when said brake band is tightened on said drum.

19. In a brake of the character described, for use with a brake drum, the combination of: a circular brake band to pass around said drum, said band having the free ends thereof lying in adjacent relation; operating means engaging the ends of said band and being operative to draw the same toward each other; means supporting said operating means, said supporting means being movable toward and away from said drum; means for exerting a force to urge said brake band into concentric relation to said brake drum when the brake band is released by said operating means; and a stop member to limit the distance said supporting and said operating means may be moved away from said drum, whereby said operating means will move away from said drum when said brake band is released and will move toward said drum when said brake band is tightened on said drum.

20. In a brake of the character described, for use with a brake drum, the combination of: a brake band member to encircle said drum, with the ends thereof disposed in adjacent relation; a support contiguous to said ends, said support being mounted so as to have limited movement toward and away from said drum; means connecting one end of said band member to said support; a body movably carried on said support so as to be movable toward and away from said connecting means; means to join the other end of said band member to said body; and force applying means for moving said body relatively to said connecting means so as to constrict said band member around said brake drum.

21. In a brake of the character described, for use with a brake drum, the combination of: a brake band member to encircle said drum, with the ends thereof disposed in adjacent relation; a support contiguous to said ends, said support being mounted so as to have movement toward and away from said drum; means connecting one end of said band member to said support so that said one end moves toward and away from said drum with said support; means independent of said band for limiting movement of said support and one end away from said drum; and brake actuating means connected to said support and to the other end of said band member, operative to move said other end of said band member relatively to said connecting means to constrict said band member around said brake drum.

22. In a brake of the character described, for use with a brake drum, the combination of: a brake band member to encircle said drum, with the ends thereof disposed in adjacent relation; a support contiguous to said ends, said support being mounted so as to have limited movement toward and away from said drum and so as to have limited bodily movement with said brake band member when said brake band member is moved in reverse direction by said drum; means connecting one end of said band member to said support; a body movably carried on said support so as to be movable toward and away from said connecting means; means to join the other end of said band member to said body; and force applying means for moving said body relatively to said connecting means so as to constrict said band member around said brake drum, said force applying means operating to separate said body and said connecting means in response to said limited bodily movement of said support when said brake band member is moved in reverse direction.

23. In a brake of the character described, for use with a brake drum, the combination of: a brake band member to encircle said drum, with the ends thereof disposed in adjacent relation; a support contiguous to said ends, said support being mounted so as to have limited movement toward and away from said drum, and so as to have limited bodily movement with said brake band member when said brake band member is moved in reverse direction by said drum; means connecting one end of said band member to said support; and brake actuating lever means connected to said support and to the other end of said band member, operative when swung forwardly to move said other end of said band member relatively to said connecting means to constrict said band member around said brake drum, said lever means swinging in reverse direction in response to said limited bodily movement of said support.

24. In a brake of the character described, for use with a brake drum, the combination of: a circular band extending around said drum, said band having the free ends thereof in adjacent relation; a bar supported so as to extend contiguous to said free ends of said band; anchor means connecting one portion of said bar to the dead end of said band; a sleeve slidable on said bar; a body adjustable on said sleeve; means pivotally connecting the live end of said band to said body; means to adjust said body longitudinally of said sleeve; and means operative between said sleeve and said bar to move said sleeve and said body relatively to said anchor means and thereby tighten said band.

25. In a brake of the character described, for use with a brake drum, the combination of: a circular band extending around said drum, said band having the free ends thereof in adjacent relation; a bar supported so as to extend contiguous to said free ends of said band; anchor means connecting one portion of said bar to the dead end of said band; a sleeve slidable on said bar; a body adjustable on said sleeve; means pivotally connecting the live end of said band to said body; means to adjust said body longitudinally of said sleeve; fluid expansible means connected between said sleeve and said bar; and manually controlled means for applying fluid pressure to said fluid expansible means to move said sleeve and said body relatively to said anchor means and thereby tighten said bar.

26. In a brake of the character described, for use with a brake drum, the combination of: a circular band extending around said drum, said band having the free ends thereof in adjacent relation; a bar extending contiguous to said free ends of said band; a supporting bracket element connected to one end of said bar so as to permit said bar to swing toward and away from said drum; a stop to limit the distance said bar may swing away from said drum; yieldable means urging the assembly comprising said bar and said band in a direction to move said bar away from said drum when said band is in released condition; anchor means connecting the other end of said bar to the dead end of said band; a sleeve slidable on said bar; a body adjustable on said sleeve; means pivotally connecting the live end of said band to said body; means to adjust said body longitudinally of said sleeve; and means operative between said sleeve and said bar to move said sleeve and said body relatively to said anchor means and thereby tighten said band.

27. In a brake of the character described, for use with a brake drum, the combination of: a circular band extending around said drum, said band having the free ends thereof in adjacent relation; a bar extending contiguous to said free ends of said band; a supporting bracket element connected to one end of said bar so as to permit said bar to swing toward and away from said drum; a stop to limit the distance said bar may swing away from said drum; yieldable means urging the assembly comprising said bar and said band in a direction to move said bar away from said drum when said band is in released condition; kick relieving means comprising a yieldable member disposed between said bar and said supporting bracket to permit a limited movement of said bar in a direction along its axis; anchor means connecting the other end of said bar to the dead end of said band; a sleeve slidable on said bar; a body adjustable on said sleeve; means pivotally connecting the live end of said band to said body; means to adjust said body longitudinally of said sleeve; and means operative between said sleeve and said bar to move said sleeve and said body relatively to said anchor means and thereby tighten said band.

GUGLIELMO R. TREMOLADA.